(12) United States Patent
Oberti et al.

(10) Patent No.: US 7,690,484 B2
(45) Date of Patent: Apr. 6, 2010

(54) BRAKING BAND, A VENTILATED DISK-BRAKE DISK, AND A CORE BOX FOR THE PRODUCTION OF A DISK-BRAKE DISK CORE

(75) Inventors: Leone Oberti, Lenna (IT); Lorenzo Cavagna, Bonate Sopra (IT); Giuseppe Meroni, Lecco (IT)

(73) Assignee: Freni Brembo S.p.A. (IT)

( * ) Notice: Subject to any disclaimer, the term of this patent is extended or adjusted under 35 U.S.C. 154(b) by 0 days.

(21) Appl. No.: 10/473,822

(22) PCT Filed: Apr. 5, 2002

(86) PCT No.: PCT/IT02/00213

§ 371 (c)(1),
(2), (4) Date: Oct. 2, 2003

(87) PCT Pub. No.: WO02/081940

PCT Pub. Date: Oct. 17, 2002

(65) Prior Publication Data

US 2004/0124047 A1      Jul. 1, 2004

(30) Foreign Application Priority Data

Apr. 6, 2001    (EP) .................................. 01830243

(51) Int. Cl.
*F16D 65/12* (2006.01)
(52) U.S. Cl. .......................... 188/218 XL; 188/264 AA
(58) Field of Classification Search ........... 188/218 XL, 188/264 A, 264 R, 264 AA
See application file for complete search history.

(56) References Cited

U.S. PATENT DOCUMENTS

| 4,865,167 A | * | 9/1989 | Giorgetti et al. | ...... 188/218 XL |
| 5,503,214 A | | 4/1996 | Cribley et al. | |
| 5,542,503 A | | 8/1996 | Dunn et al. | |

(Continued)

FOREIGN PATENT DOCUMENTS

DE          42 10 449 A1      10/1993

(Continued)

OTHER PUBLICATIONS

International Search Report dated Aug. 16, 2002, for Application No. PCT/IT02/00213.

*Primary Examiner*—Thomas J Williams
(74) *Attorney, Agent, or Firm*—Hogan & Hartson LLP

(57) ABSTRACT

A braking band with a remarkable capacity for improved cooling, for use in disk-brake disks, comprises two plates coaxial with an axis, facing one another, and spaced apart to form a space in which an air-flow takes place from the axis towards the outer side of the band, the plates having facing surfaces from which pillar-like elements extend, transversely, to connect the plates, the pillar-like elements being distributed in circular rings or rows concentric with the plates so as to be distributed uniformly in the space, those pillar-like elements which are disposed in inside rows of the braking band having rhombic cross-sections. The rhombic cross-sections of the pillar-like elements which are in inside rows of the band are symmetrical with respect to an axis transverse the direction of flow and each element for connection between the plates extends from one plate to the other whilst remaining within the space.

50 Claims, 8 Drawing Sheets

Figure 1:
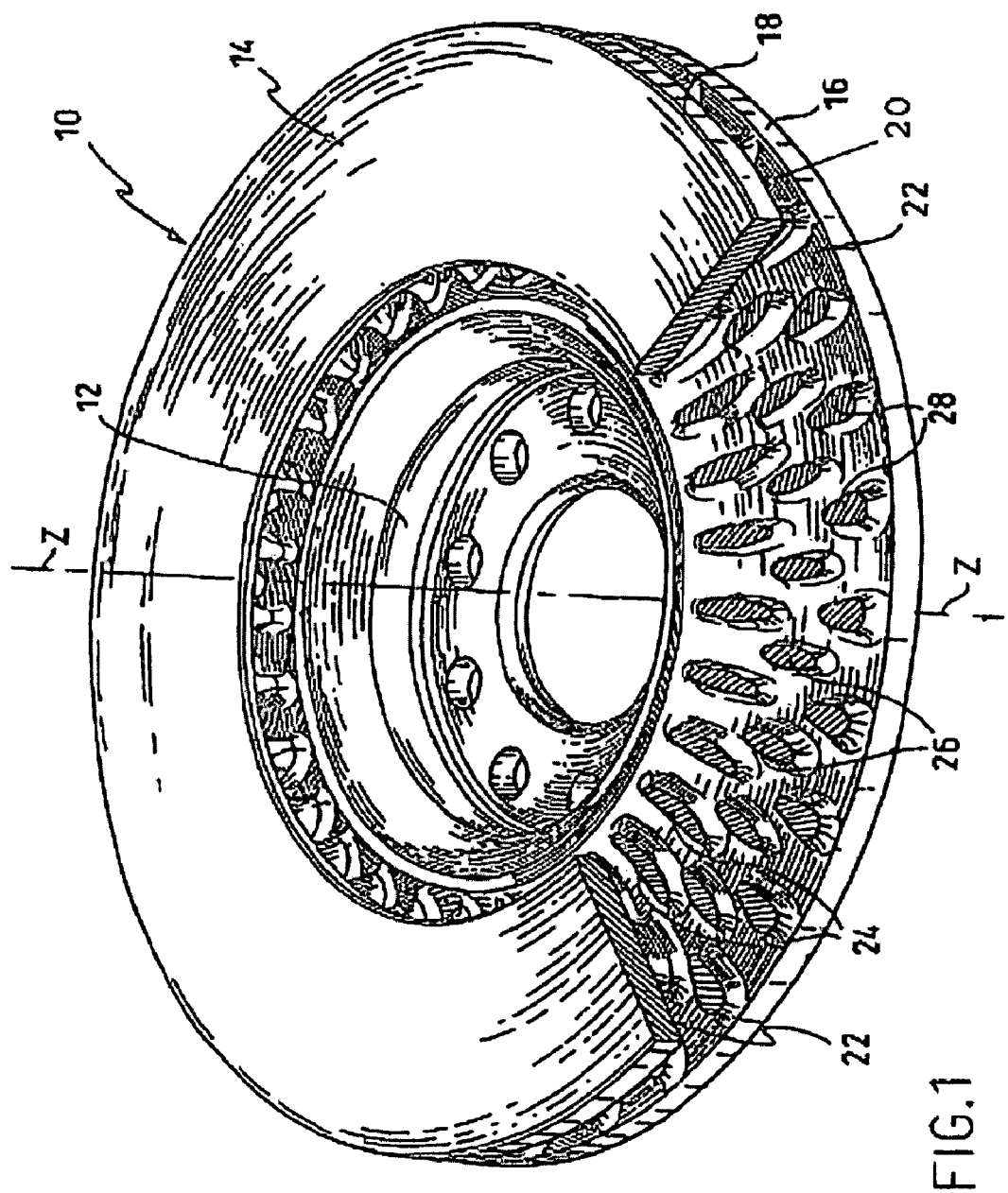

U.S. PATENT DOCUMENTS 6,152,270 A  11/2000  Giorgetti  .............. 188/218 XL

FOREIGN PATENT DOCUMENTS

| EP | 0 318 687 A | | 6/1989 |
|---|---|---|---|
| EP | 0 989 321 A | | 3/2000 |
| FR | 2 339 453 | | 8/1977 |
| GB | 2144186 A | * | 2/1985 |

* cited by examiner

BRAKING BAND, A VENTILATED DISK-BRAKE DISK, AND A CORE BOX FOR THE PRODUCTION OF A DISK-BRAKE DISK CORE

The present invention relates to a braking band and to a ventilated disk-brake disk, particularly but not exclusively for applications in the automotive field.

A further aspect of the present invention relates to a core box for the production of a disk-brake disk core.

As is known, a disk of the type specified above is constituted by two coaxial portions. A first portion, the support bell, is for connection to the wheel hub of a vehicle, and the remaining, peripheral portion, the so-called braking band, is for cooperating with the disk-brake calipers in order to exert the braking force on the vehicle.

More particularly, the present invention relates to a so-called ventilated disk, that is, a disk in which the braking band is constituted by two facing, coaxial plates, spaced apart so as to form a space. The two plates are connected by pillar-like elements which extend through the space between the two plates. Ventilation ducts are thus created between the plates and air flows through the ducts in a direction from the inner side of the braking band towards the outer side, thus helping to dissipate to the environment the heat generated in the band upon each braking operation.

Pillar-like elements of various shapes, of various sizes, and distributed variously around the space in the braking band are known. Disk-brake disks in which the pillar-like elements are in a quincuncial arrangement and in three rows are known. Moreover, the shape of the cross-section of each pillar-like element, taken in an area substantially parallel to the direction of the air-flow through the space, varies from row to row. In particular, the elements of the inner row have a cross-section which is tapered towards the outer side of the braking band.

A disk of this type is described, for example, in U.S. Pat. No. 4,865,167.

Disks with pillar-like elements of different radial extent, which are rounded towards the interior of the braking band are also known. A disk of this type is described, for example, in U.S. Pat. No. 6,152,270.

Other disks provided with pillar-like elements are known from EP-A-0318687, EP-A-0989321, and DE-A-4210449.

Although these known disks are satisfactory from some points of view, they have considerable disadvantages.

First of all, poor ventilation efficiency or, in other words, a poor cooling capacity has been noted, due to the resistance offered to the flow of air inside the space present in the braking band, which resistance is caused by the known shape of the elements connecting the plates.

Moreover, poor resistance of the braking band to thermal stresses and, in some extreme cases, to mechanical stresses has been noted, this poor resistance being caused mainly by the known geometrical arrangement of the elements connecting the plates.

As is also known, disk-brake disks are produced by casting and the ventilation ducts between the two plates are formed during casting, with the use of a core. The core in turn is formed by the injection of core sand, that is, an agglomerate of sand and resins, into a core box.

The latter is constituted by two half-shells which, when coupled, define inside them a cavity which reproduces, amongst other things, the internal structure of the disk and, in particular, the space between the two plates. The two half-shells consequently have projecting elements for defining cavities in the core which, when the disk is cast will form the pillar-shaped elements connecting the two plates.

During the production of the core, the core sand is injected into the two coupled half-shells by being made to flow from the innermost diameter to the outermost diameter. When the sand starts to flow through the cavity which will define the space between the two plates, the projecting elements and, in particular, the inner row, consequently cause an obstruction to the flow of sand.

The core-moulding step is therefore critical, because of the above-mentioned obstructions. In fact, the sand which is in the vicinity of the pillar-like elements of the outermost row and, in particular, in the region facing outwardly relative to the disk, does not have the necessary compactness to withstand the casting of the molten metal. During casting, the flow of molten metal may in fact undermine the less compact regions of the core and replace them, giving rise to undesired protuberances which adversely affect the further processing steps and the operation of the disk.

The protuberances may cause obstructions in the first subsequent processing step in which the disk is gripped and located by restraining elements which are inserted in the space between the plates. Moreover, the protuberances may, for example, lead to an imbalance in the masses of the disk so that a larger amount of material has to be removed in the balancing step at the end of the processing cycle. Finally, when the disk is in use, the presence of these protuberances may constitute an obstruction to the air-flow through the ventilation ducts, giving rise to disturbances in the flow with a consequent reduction in cooling efficiency. It is clear form the foregoing that, to prevent the above-mentioned disadvantages, there is a particular requirement in this field to achieve a correct degree of compactness in every portion of the core which will subsequently be used during the casting of a disk-brake disk.

The object of the present invention is to devise and to provide a braking band, a ventilated disk-brake disk, and a core box for the production of a disk-brake disk core which satisfy the above-mentioned requirements and, at the same time, prevent the problems mentioned with reference to the prior art.

This object is achieved by means of a braking band for a disk-brake disk by means of a ventilated disk-brake disk, and by means of a core box for the production of a disk-brake disk core.

Figure 2:
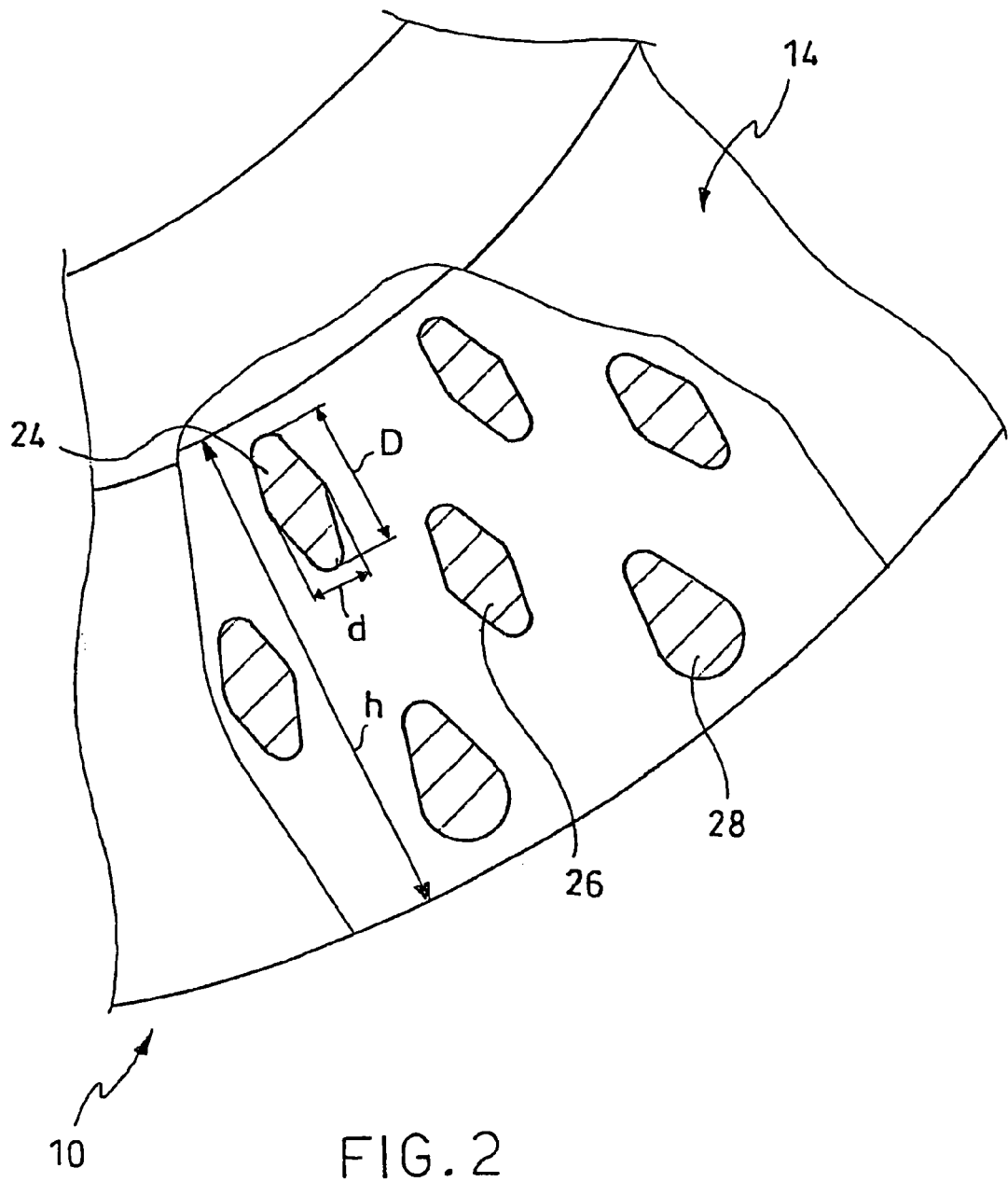
Figure 3:
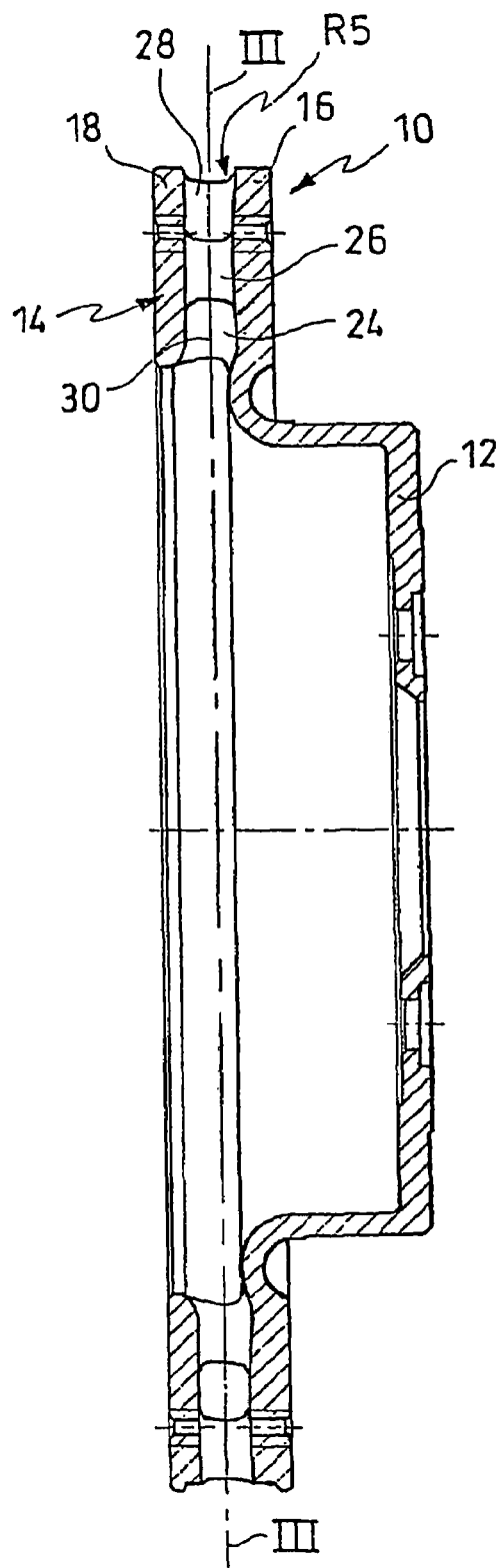
Figure 4:
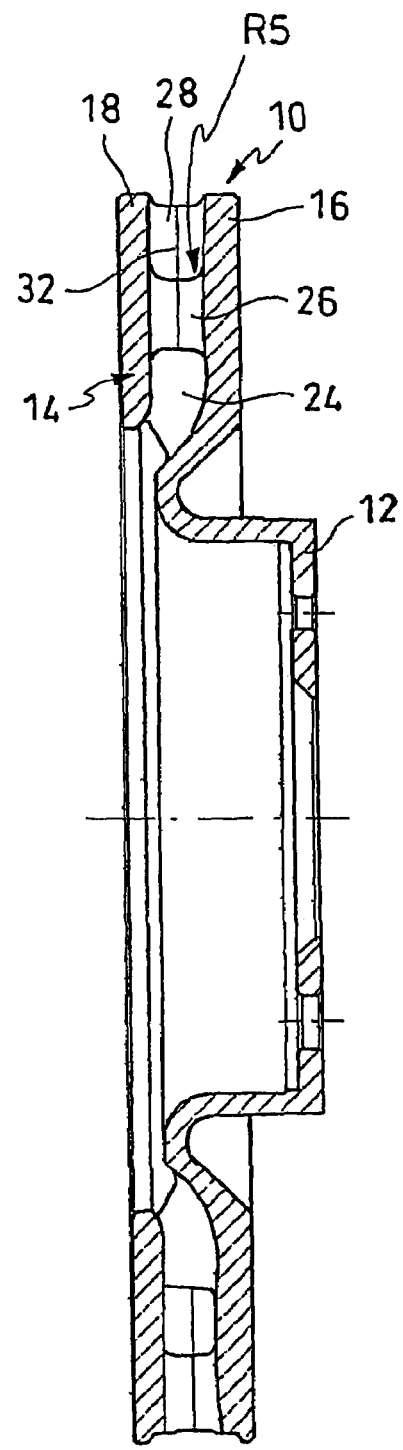
Figure 5:
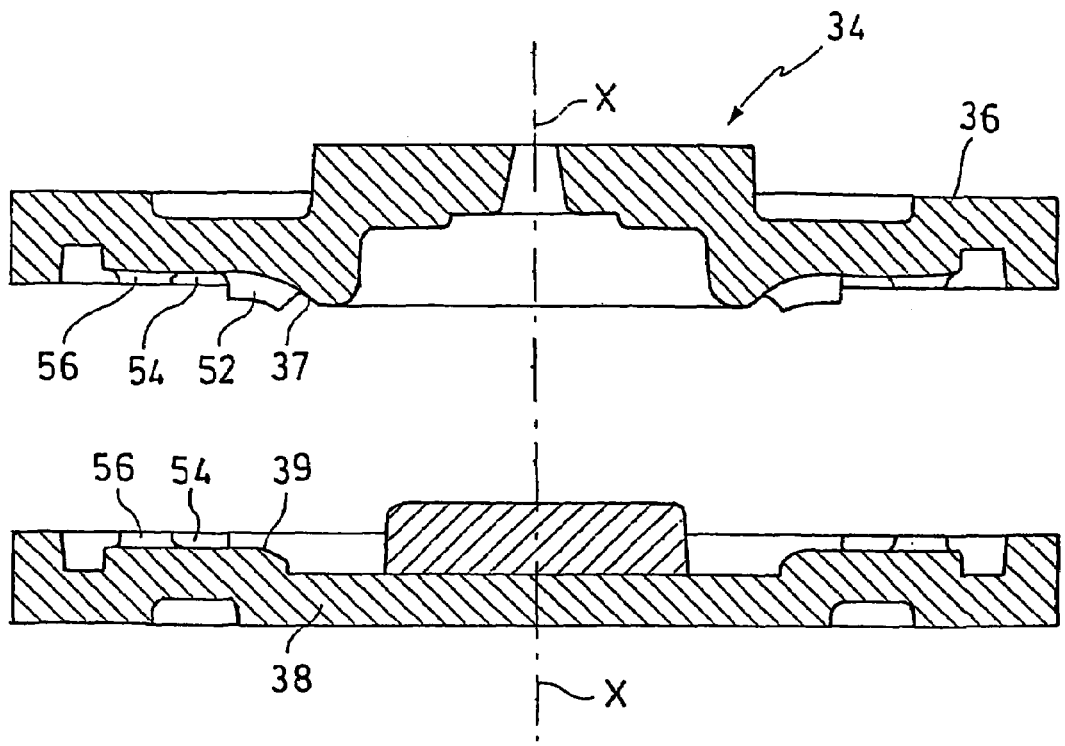
Figure 6:
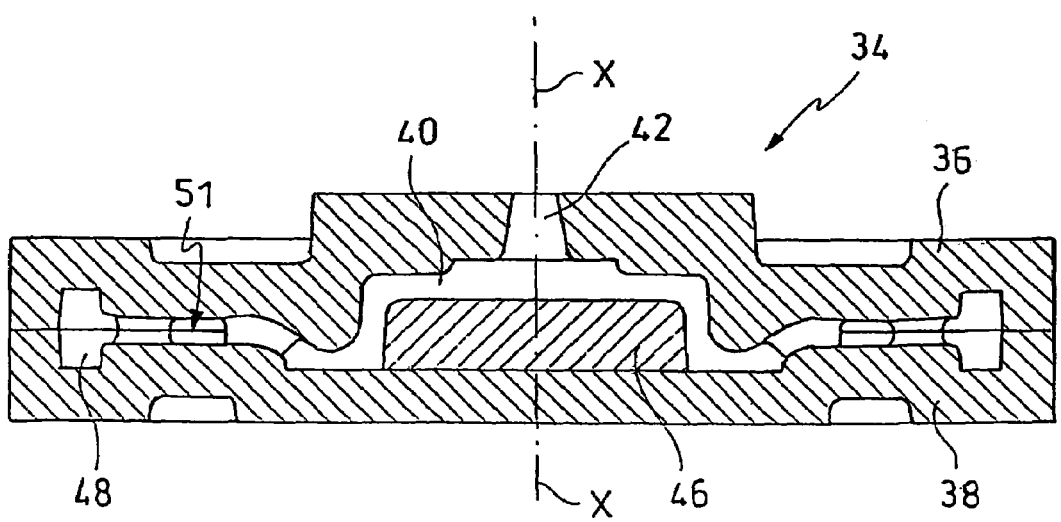
Figure 7:
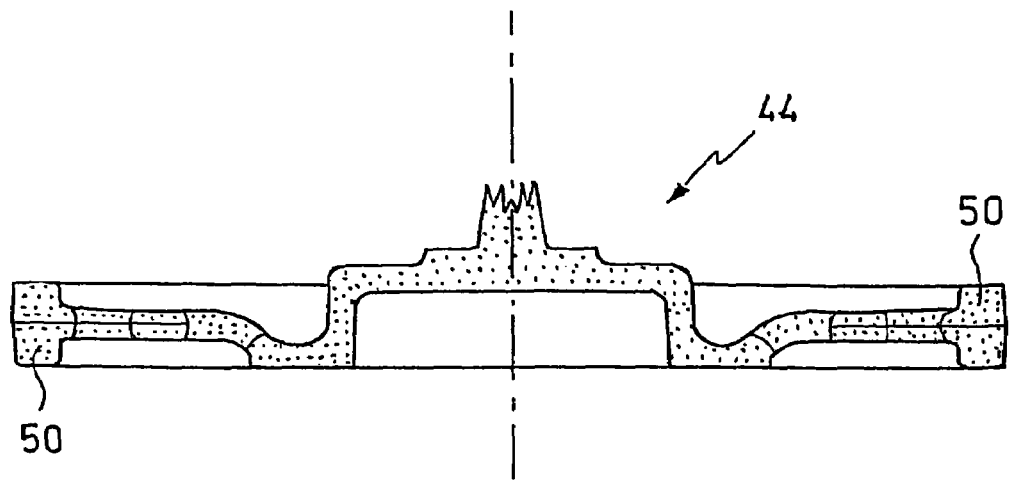
Figure 8:
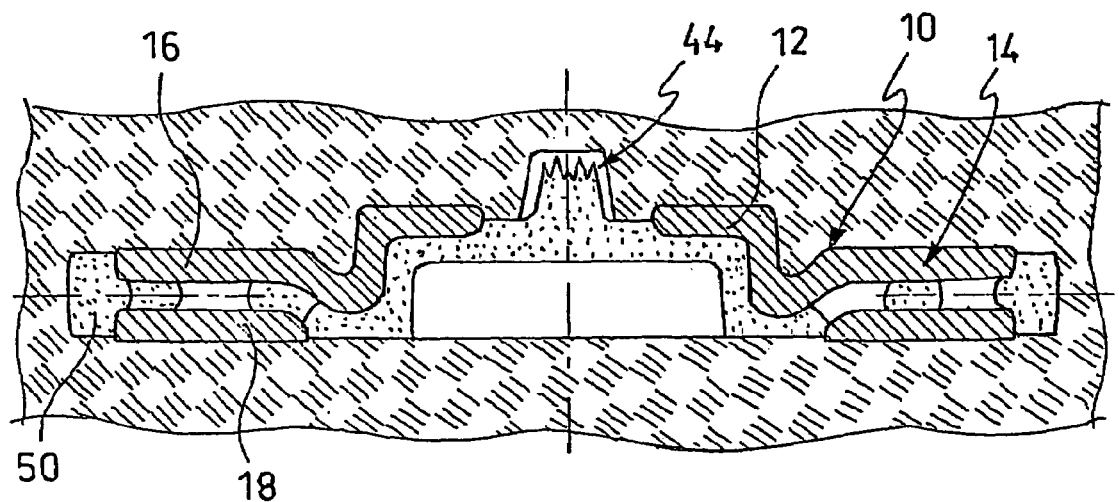
Figure 9:
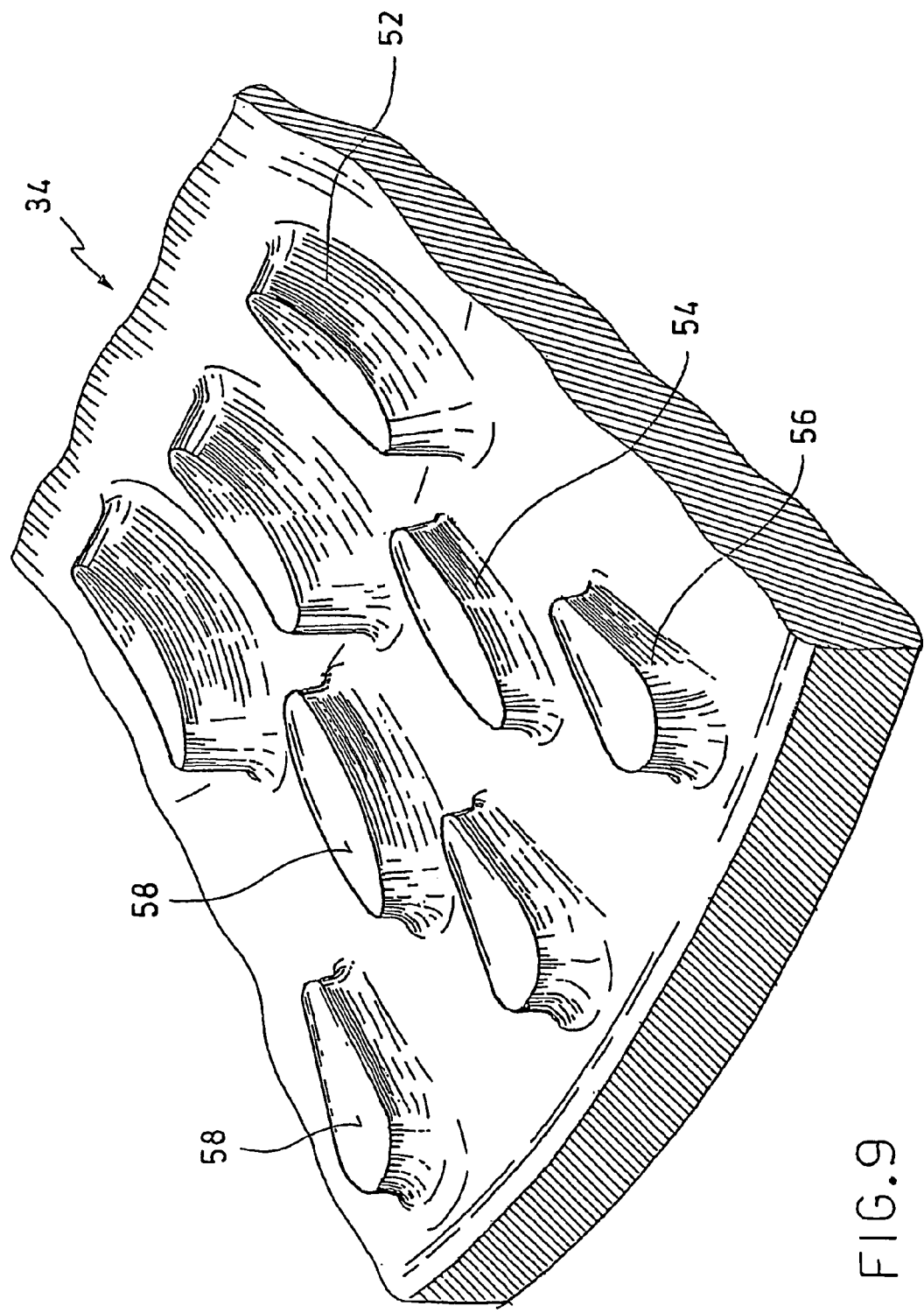
Figure 10:
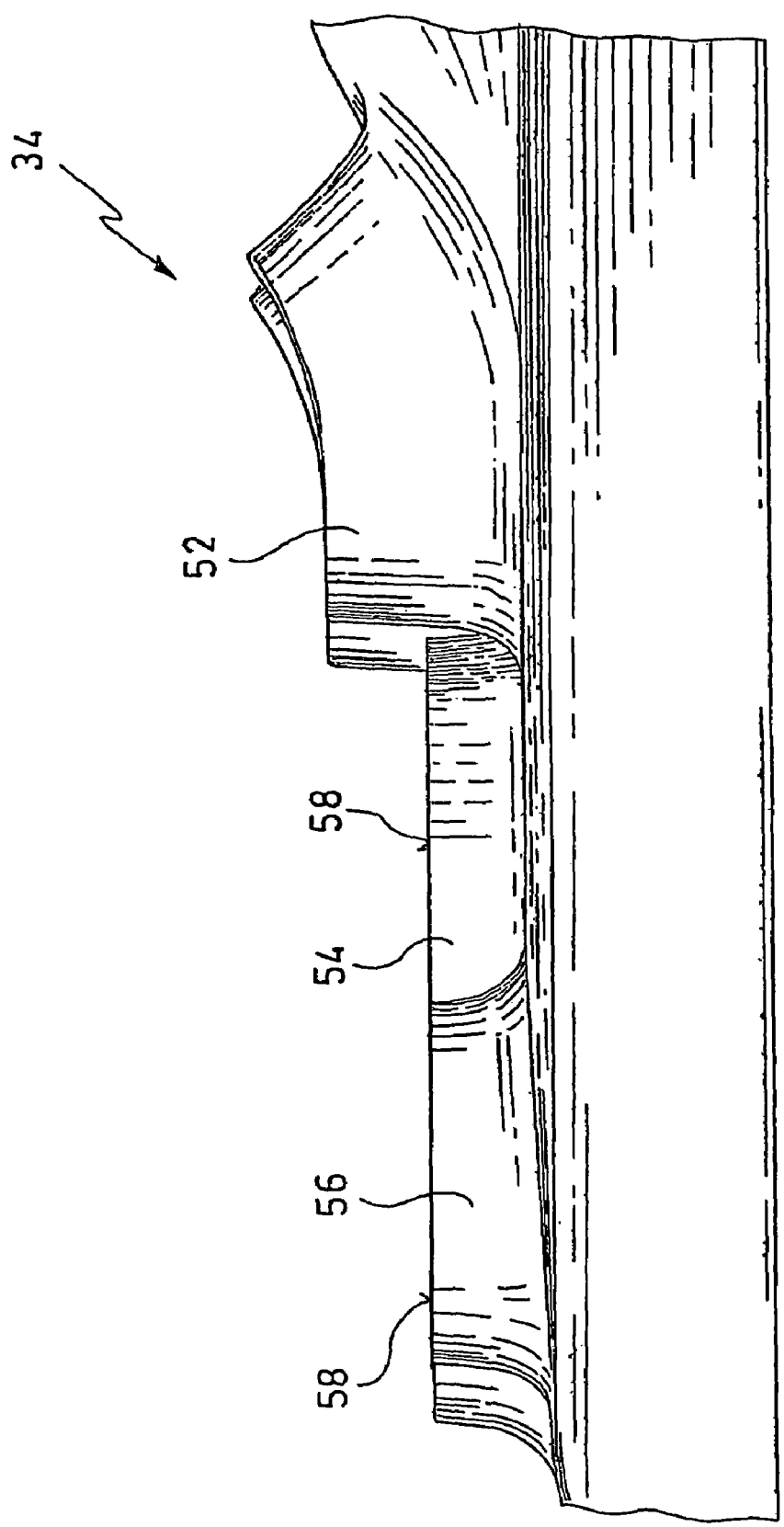
Figure 11:
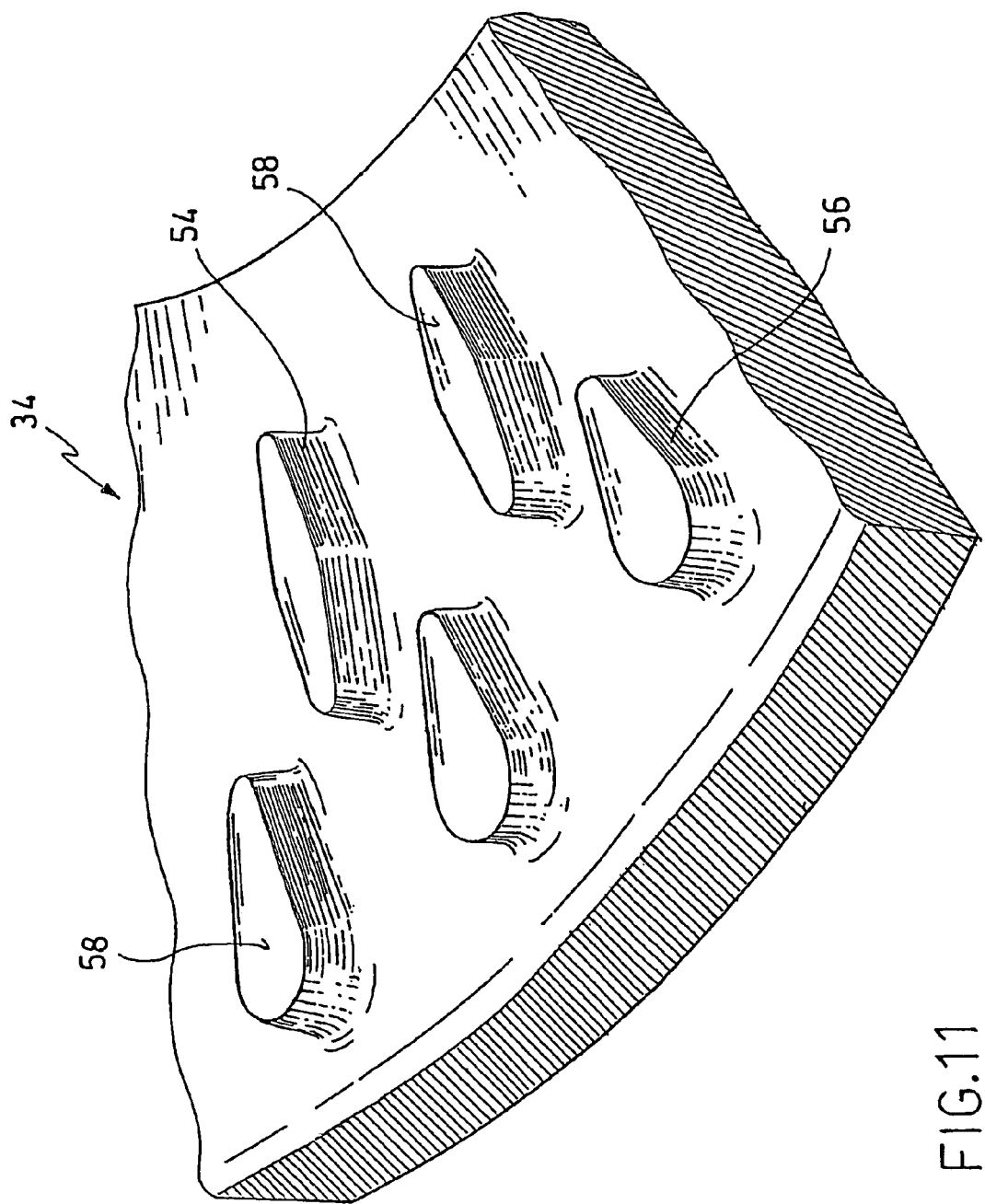

Further characteristics and the advantages of the band, of the disk, and of the core box according to the invention will become clear from the following description of a preferred embodiment thereof, given by way of non-limiting example with reference to the appended drawings, in which:

FIG. 1 is a partially-sectioned, perspective view of a disk-brake disk according to the present invention, FIG. 2 is a partially-sectioned, front view of the disk of FIG. 1, FIG. 3 is a section through the disk, taken on the line III-III of FIG. 2, FIG. 4 is a section through a possible variant of the disk of FIG. 3, FIG. 5 is a diametral section through a core box according to the present invention, FIG. 6 shows the core box of FIG. 5 in a different operative condition, FIG. 7 is a diametral section through a core produced by the core box of FIGS. 5 and 6, FIG. 8 shows, in diametral section, a disk-brake disk at the stage of its production by casting, FIG. 9 is a partially-sectioned, perspective view of a detail of the core box, FIG. 10 is a partially-sectioned, side view of the detail of FIG. 9, and FIG. 11 is a partially-sectioned, perspective view of a second detail of the core box.

With reference to the above-mentioned drawings, a disk-brake disk according to the present invention, in particular, a so-called ventilated disk for use in a disk brake (not shown) of a vehicle such as a motor car, is generally indicated 10. The disk 10 is substantially circular and extends about an axis indicated Z-Z in the drawings.

The disk 10 comprises a support bell 12 and a braking band 14 coaxial with the bell 12.

The braking band 14, which is intended to cooperate with the disk-brake calipers in order to exert the braking force on the vehicle, comprises a first plate 16 and a second plate 18 arranged coaxially on the axis Z-Z. The first plate 16 is on the same side as the bell support 12 and the second plate 18 is on the opposite side.

The two plates face one another and are spaced apart to form a space 20 in which an air-flow takes place from the axis Z-Z towards the outer side of the braking band 14 during the rotation of the disk.

The two plates have facing surfaces 22 from which pillar-like elements 24, 26 and 28, also commonly known as pins, extend transversely.

The pillar-like elements extend to connect the two plates. In particular, the first plate is formed continuously with the support bell 12 and the second plate 18 is connected to the first by means of the pillar-like elements.

The pillar-like elements are distributed uniformly around the facing surfaces 22 of the plates and, in the embodiment shown, are divided into three concentric, circular rings or rows corresponding to an inner row, that is, the row closest to the axis Z-Z, an intermediate row, and an outer row, that is, the row farthest from the axis Z-Z. For simplicity of description, the pillar-like elements of the inner row are indicated 24, the pillar-like elements of the intermediate row are indicated 26 and, finally, the pillar-like elements of the outer row are indicated 28. According to one embodiment, the pillar-like elements comprise more than one intermediate row (intermediate pillar-like elements 26), for example two intermediate rows disposed between the inner row (the inner pillar-like elements 24) and the outer row (the outer pillar-like elements 28).

The pillar-like elements 24 of the inner row constitute pillar-like elements which are disposed in the vicinity of the edge of the braking band 14 that faces the axis Z-Z. The cross-section of each of these pillar-like elements in an area substantially parallel to the direction of the air-flow in the space is tapered towards the axis Z-Z. In greater detail, the pillar-like elements have a cross-section which is tapered both towards the axis Z-Z of the plates and towards the outer side of the braking band 14, forming a substantially rhombic cross-section.

According to one embodiment, the pillar-like elements 24, 26 arranged in inside rows of the band, meaning the inner row and the at least one intermediate row, have rhombic cross-sections, cross-section meaning a section considered in an area substantially parallel to the direction of the air-flow through the space 20, as will be described further below.

The rhombic cross-section is a cross-section which has four at least partially flat sides. A pillar-like element having a rhombic cross-section is an element which has a lateral surface or wall comprising four at least partially flat faces suitable for defining a ventilation duct of the braking band and suitable for directing the air-flow from the interior towards the exterior of the disk in the manner which will be described in greater detail below.

According to one embodiment, the pillar-like elements 24, 26 have linked flat surfaces defining the rhombic cross-section.

In particular, according to one embodiment, the pillar-like elements 24, 26 of the inner and intermediate rows have, in a radial direction, ends with a first link radii variable from 1.5 mm to 2.5 mm and preferably 2 mm. The pillar-like elements 28 of the outer row have, in a radial direction, a first end with the first link radius variable from 1.5 mm to 2.5 mm and preferably 2 mm, and a second end, preferably the outer end, with a second link radius variable from 4 mm to 5 mm and preferably 4.5 mm. The pillar-like elements 24 of the inner row have, in a direction transverse the direction of flow, a third link radii variable from 3 mm to 3.5 mm between the flat surfaces. The pillar-like elements 26 of the at least one intermediate row have, in a direction transverse the direction of flow, a fourth link radii variable from 3.5 to 4 mm between the flat surfaces.

Preferably, all of the pillar-like elements 24, 26, 28 are connected to the plates 16, 18 with link radii R5 variable from 3 mm to 4 mm, preferably 3.5 mm (FIGS. 3 and 4).

Advantageously, the rhombic cross-sections of the pillar-like elements 24, 26 which are in inside rows of the band 14 are symmetrical with respect to an axis transverse the direction of flow and each element 24, 26, 28 suitable for connection between the plates 16, 18 extends from one plate to the other 16, 18, whilst remaining inside the space 20. In other words, starting from a central portion of maximum tangential extent or largest dimension, a pillar-like element of the inside rows of the band (the inner row, or row closest to the axis Z-Z and the at least one intermediate row) is tapered towards the interior and towards the exterior of the disk with portions of equal extent and advantageously together forming pairs of parallel faces arranged for directing air in a controlled manner through the ducts or channels defined in the space. Moreover, each element which serves for the connection of the plates does not project or protrude outside the space 20, avoiding the formation of elements for diverting the air-flow which project from the space to the exterior of the plates. In other words, the inner opening and the outer opening of the space 20 are free of obstacles to the free circulation of the air-flow.

With further advantage, the radial ends of the cross-sections of adjacent rows are substantially aligned on the same circle (FIG. 2). In other words, between adjacent rows, for example, the inner row and the intermediate row, or the intermediate row and the outer row, there is no overlap in a tangential direction between the pillar-like elements 24 and 26 or 26 and 28 (any circle concentric with the axis Z-Z of the plates 16, 18 and extending through pillar-like elements of one row does not extend through pillar-like elements of another row).

Advantageously, each of the pillar-like elements 24, 26, 28 of each row has substantially the same radial extent D in the said cross-section. In other words, the connecting elements of the plates are connecting areas for the plates, and hence also stiffening areas, which are distributed uniformly over the extent of the plates as a whole.

Advantageously, the pillar-like elements 24, 26, 28 interconnect the plates 16, 18 over an area no greater than 15%-25%, preferably 20% of the total facing surface area of each plate. In other words, the facing plates, which have an overall inner lateral surface area (substantially equal to an outer surface area suitable for interacting with pads of a braking system or braking surface), are covered by the connecting elements over an area variable from 15% to 25% and preferably 20% of the overall area of the facing surface.

According to one embodiment, the two plates 16, 18 are connected by pillar-like elements 24, 28 disposed along at least one inner row and one outer row which are concentric with one another.

According to a further embodiment, one or two further intermediate rows of pillar-like elements 26 are provided.

Preferably, the pillar-like elements 26 of the at least one intermediate row are offset relative to those 24, 28 of the inner and outer rows.

With further advantage, the pillar-like elements 24, 26, 28 are distributed between the two plates 16, 18 in a quincuncial arrangement.

The dimensions of the pillar-like elements may vary on the basis of the vehicle for which the disk is intended. For example, the dimension in the circumferential direction, that is, the shorter diagonal d of the rhombus, has a value which is variable in dependence on the type of vehicle, for example, 6 mm for a motor car or 10-12 mm for a commercial vehicle, whereas the dimension in a radial direction, that is, the longer diagonal D, has a value which depends on the width h of the braking band, meaning the difference between the outside radius and the inside radius of the braking band. The sides of the rhombic cross-section are linked together.

According to one embodiment, the pillar-like elements 24 of the inner row have, in an area substantially parallel to the direction of the air-flow through the space 20, a diagonal of the rhombic cross-section transverse the direction of flow having dimensions of between 6 mm and 7 mm.

According to a further embodiment, the pillar-like elements 26 of the at least one intermediate row have, in an area substantially parallel to the direction of the air-flow through the space 20, a diagonal of the rhombic cross-section transverse the direction of flow having dimensions of between 7 mm and 8 mm.

This cross-section is shown, by way of example, in FIG. 2 which is a front view of the disk and of the braking band in which the second plate 18 has been partially sectioned to show the shapes of the pillar-like elements of the at least three rows. This cross-section therefore corresponds to the above-mentioned area substantially parallel to the direction of the air-flow through the space and may correspond to a plane transverse the axis Z-Z of the disk, or to an arcuate area, in dependence on the shapes adopted by the two plates and by the space.

The cross-section of each of the pillar-like elements 28 of the outer row in an area substantially parallel to the direction of the air-flow through the space is drop-shaped. In particular, this cross-section is tapered towards the axis Z-Z of the plates and has an outer link portion, for example, with a radius of 5 mm.

Moreover, the cross-section of each of the pillar-like elements 26 of the intermediate row in an area substantially parallel to the direction of the air-flow through the space is tapered both towards the axis Z-Z of the plates and towards the outer side of the braking band. The pillar-shaped elements of the intermediate row thus also have a substantially rhombic cross-section similar to that of the pillar-like elements of the inner row.

The following are some possible definitions of the area substantially parallel to the direction of the air-flow through the space.

The embodiment of FIG. 3 in fact has a disk in which the two plates constituting the braking band are substantially parallel to planes perpendicular to the axis Z-Z and the space 20 correspondingly extends in a ring coaxial with the axis Z-Z. The connection between the first plate 16 and the bell 12 is formed between walls which are substantially perpendicular to one another, although they are suitably linked. In this configuration, the facing surfaces 22 of the two plates extend in two planes from which the pillar-like elements 24-28 project perpendicularly. According to this embodiment, the air-flow enters the space 20 in the vicinity of the region closest to the axis Z-Z and passes through it towards the outer side of the braking band. As a result, an area substantially parallel to the direction of the air-flow through the space 20 could be constituted by the median plane of the space, indicated by a line 30 in FIG. 3.

The example of FIG. 4 shows a further embodiment of the disk in which, with respect to the axis Z-Z, an outer portion of the first plate 16 is substantially parallel to planes perpendicular to the axis Z-Z, whereas an inner portion of the first plate 16 deviates, curving towards the second plate 18. The space 20 correspondingly extends in a ring coaxial with the axis Z-Z at least in the outer portion of the band whereas, in the region of the deviation of the first plate 16, the space deviates away from the bell. In fact, the connection between the first plate 16 and the bell is formed between walls which are substantially inclined to one another and suitably linked. In this configuration, the surface 22 of the second plate 18 extends in a plane perpendicular to the axis Z-Z, whereas the surface 22 of the first plate has a curved shape. The three rows of pillar-like elements are distributed over the entire extent of the braking band. In particular, the innermost row, indicated by the pillar-like elements 24, also follows the shape of the arcuate portion of the space, by virtue of its shape, tapered towards the inner side of the braking band. In an embodiment of this type, the air-flow enters the space in the vicinity of the region closest to the axis Z-Z, which is arranged almost facing the front of the disk, and passes through the space towards the outer side of the band. As a result, an area substantially parallel to the direction of the air-flow through the space could be constituted, for example, by the central area of the space, which is indicated by a line 32 in FIG. 4.

In the embodiment shown, with reference, for example, to FIG. 2, the pillar-shaped elements of the intermediate row are offset relative to those of the inner row and of the outer row. In particular, the pillar-like elements 24, 26 and 28 are distributed between the two plates in a quincuncial arrangement.

Moreover, as shown in FIGS. 1 to 4, the bell 12 and the braking band 14 are formed as a single element, produced by casting, in which the braking band extends continuously from the support bell.

The connecting portion between the bell and the braking band may adopt different configurations two of which are shown, for example, in FIGS. 3 and 4, as described above.

As will be appreciated from the foregoing description, by virtue of the provision of a braking band provided with plates connected by pillar-like connection elements which are disposed entirely within the space and, in the case of the pillar-like elements of the inside rows, are of symmetrical rhombic shape, it is possible to overcome the disadvantages of the disks of the prior art and, in particular, a remarkable improvement has been found in the air-flow through the ventilation ducts or channels of the space.

Moreover, as will be appreciated from the foregoing description, by virtue of the provision of a braking band having plates connected by pillar-like connecting elements disposed in adjacent rows in which the radial ends of the cross-sections are substantially aligned on the same circle, and in which each of the pillar-like elements 24, 26, 28 of each row has substantially the same radial extent in the said cross-section, it is possible to overcome the disadvantages of the disks of the prior art and, in particular, a remarkable improvement has been found in the resistance of the braking band, for example, to the large stresses caused by considerable thermal gradients, as well as a low incidence of splitting or cracking in the plates even when they are stressed by severe and repeated braking operations.

A comparison of tests on the behavior of the air-flow in a ventilation duct or channel provided in the space between two plates of a disk having a geometrical arrangement according to the prior art and a disk having a geometrical arrangement according to the present invention demonstrates the remarkable improvement in the ventilation achieved by the geometrical arrangement of the solution proposed herein. In particular, it is possible to evaluate the vector field of the velocity of the air-flow which passes through a portion of space of a known disk and of the disk having the geometrical arrangement resulting from the solution proposed herein, which field is repeated circumferentially throughout the space. The comparative test between the known geometrical arrangement and that of the solution proposed herein was carried out by a computational fluid-dynamics program, by setting as conditions, rotation of the disk at 1500 rpm (revolutions per minute), an ambient pressure at the input and output of the space, and a temperature of 20° C. By this test it was possible to compare the vector fields and to conclude that the air-flow in the solution proposed herein was more uniform, both at the input to the space and at the output therefrom, and passed around the pillar-like elements much better or, in other words, was diverted less by the impact against the pillar-like elements. From a quantitative comparison, it was found that the maximum velocity reached by the air in the solution proposed herein was slightly reduced in comparison with the maximum velocity of the known solution, in favor of a considerable increase in the minimum air velocity, consequently leading to an improvement or increase in the volume flow (in liters per second of air) of more than 5% in comparison with the flow-rate of the known disk.

Further Advantages of the Solution Proposed are:

the proposed transverse extent of the elements of the inner and intermediate rows (the inside rows of the band) enables improved control of the air-flow in the space to be achieved,
  the lack of overlap or space between the adjacent rows renders the local stiffness of the entire disk homogeneous, avoiding the disadvantage which is present in the case of overlap (although small) of connection elements of adjacent rows or, in other words, avoiding circular portions which have twice as many connection elements as other portions, and thus avoiding regions of the band having non-homogeneous stiffness,
  the provision of connecting elements having symmetrical rhombic cross-sections permits an improvement in ventilation efficiency and, in particular, an increase in the air-flow which passes through the space per unit of time,
  by virtue of the proposed link radii between the flat surfaces of the connecting elements, the achievement of a remarkable compromise between the provision of sharp corners and excessively rounded elements which, in both cases, would adversely affect the controlled transportation of the air; in particular, the proposed radius linking the pillar-like elements and the plates avoids angles which are difficult to achieve and a cross-section which is inadequate for the desired air-flow,
  by virtue of the proposed percentage of the total facing surfaces of the plates which is covered by the connecting elements, it is possible to achieve a remarkable resistance to cracking of the braking surface, permitting a controlled resistance to thermal expansion of the plates which are stressed by the braking action, and
  low weight of the disk.

The main steps of the production of the disk according to the present invention by casting are illustrated in FIGS. 5 to 8. FIGS. 5 and 6 show a core box 34 comprising a half-shell 36 to be arranged on top and a half-shell 38 to be disposed at the bottom. In FIG. 5, the two half-shells are separated whereas, in FIG. 6, they are coupled and a cavity 40 is defined inside them.

The upper half-shell 36 has a substantially circular structure extending about an axis X-X. In a central position concentric with the axis X-X, there is a duct 42 for the core sand which, by occupying the cavity 40, will give rise to a core 44, for example, shown in FIG. 7.

At least a portion of an inner surface 37 of the above-mentioned half-shell follows-substantially the shape of the inner surface of the first plate 16 and of the bell 12. In particular, it can be seen that the profile concerned is of the type shown in FIG. 4, that is, a profile in which the first plate 16 has a flat portion and an arcuate portion disposed in the vicinity of the bell.

The lower half-shell 38 also has a substantially circular structure extending about the axis X-X. In a central position, concentric with the axis X-X, there is a cylindrical protuberance 46 facing the duct 42 of the upper half-shell 36.

In the lower half-shell 38 as well, at least a portion of an inner surface 38 substantially follows the shape of a portion of the disk and, in particular, of the inner surface of the second plate 18.

When the two half-shells are coupled, as shown in FIG. 6, the peripheral portion of the cavity 40 has the structure of a ring 48 which has a depth greater than that of the adjoining portion of the cavity and can give rise to a core portion 50 which extends peripherally relative to the core.

With reference to FIG. 6, a region of the cavity 40 which, in the subsequent steps of the process will give rise to the space in the braking band, that is, the region substantially interposed between the annular ring 48 and the protuberance 46, is indicated 51. Projecting elements 52, 54 and 56, the shape and distribution of which depends on the shape and the distribution of the pillar-like elements 24-28 of the disk, extend through this region.

In particular, the projecting elements 52 are such as to form in the core 44 corresponding cavities which in turn can give rise to the pillar-like elements 24 of the inner row of the disk 10. Similarly, the projecting elements 54 are such as to form in the core 44 corresponding cavities which in turn can give rise to the pillar-like elements 26 of the intermediate row and, finally, the projecting elements 56 are such as to form in the core 44 corresponding cavities which in turn can give rise to the pillar-like elements 28 of the outer row.

Consequently, in an area parallel to the direction of flow of sand through the cavity 40, the projecting elements 52-56 have cross-sections similar to the cross-sections of the respective pillar-shaped elements 24-28. As shown in FIGS. 5, 6, 10 and 11, the projecting elements 54 and 56 extend through a portion of the depth of the cavity 40 between the two half-shells equal to approximately half of this depth. In fact, the projecting elements 54 and 56 of one half-shell have a surface 58 for contact with the respective projecting elements 54 and 56 of the other half-shell.

It is also clear from FIGS. 5, 6, 10 and 11 that the projecting elements 52 corresponding to the inner row of pillar-like elements 24 are associated with only one of the two-half-shells, that is, in the embodiment in question, with the upper half-shell 36, and extend through the entire depth of the cavity 40 between the two half-shells, contacting the inner surface 39 of the lower half-shell 38 directly. In particular, it is clear from FIG. 10 that the height of the projecting elements 52 is greater than that of the projecting elements 54 and 56 which is in fact approximately half that of the projecting elements 52.

This configuration allows the two half-shells 36 and 38 to be opened along the axis X-X in order to remove the core 44 from the mould, even when the connecting portion between the braking band 14 and the bell 12 is arcuate, as shown, for example, in FIG. 4. In fact, the configuration of the disk 10 is reproduced in similar manner in the inner surfaces 37 and 39 of the core box 34 and the presence of projecting elements 52 integral with the upper half-shell 36 avoids the presence of undercuts.

The method for the production of a disk as described above, and consequently the ways in which a core box and a core as described above are used, are described below. FIG. 5 shows the two half-shells at the stage in which they are brought together along the axis X-X. When the two half-shells are coupled as shown in FIG. 6, core sand is sent into the cavity 40 defined by the two half-shells, through the duct 42. The core sand is an agglomerate of sand and resins which polymerize as a result of the heating of the walls of the core box.

The particular shape of the projecting elements 52, the shape of which depends on the shape of the pillar-like elements 24, favors the flow of sand into the core box and ensures that the compactness necessary for the subsequent success of the casting is achieved even in the peripheral regions of the braking band.

The sand in fact maintains a high velocity up to the periphery of the core and this is influenced positively by the taper of the projecting elements 52 (corresponding to the pillar-like elements 24) which limit disturbances in the flow of sand.

When the sand has been compacted, the two half-shells are removed in the directions defined by the axis X-X and the core 44 is removed from the mould and is as shown in FIG. 7.

The core 44 is then inserted in a mould formed in sand for the casting of the disk 10.

It can be appreciated from the foregoing that the provision for the pillar-shaped elements 24 disposed in the vicinity of the edge of the braking band that faces towards the axis Z-Z to have a cross-section tapered towards the axis Z-Z and, in particular, tapered in both directions to form a rhombic cross-section in an area substantially parallel to the direction of the air-flow through the space, is particularly advantageous.

A configuration of this type is in fact reflected in a similar configuration of the projecting elements 52 and hence in a optimal degree of compactness of the core used for the casting of the disk.

The fact that it is possible to use a core having optimal characteristics of compactness consequently affects the quality of the disk produced and reduces subsequent processing. In particular, the masses of the disk are uniformly distributed and the step of the balancing of the masses of the disk is less onerous, particularly with regard to the amount of mass removed. Moreover, the advantageous configuration of the core box, and consequently of the core, permit the production of a disk which, throughout the space 20, is substantially free of imperfections or blockages which would adversely affect the air-flow therein.

The presence of an inner row of pillar-like elements 24 such as those described above enables the presence of the pillar-like elements also to be extended to the vicinity of the bell, particularly in embodiments which provide for a deviation of the first plate 16 and of the space 20 as shown, for example, in FIG. 4.

In these conditions, the presence of the projecting elements 52 enables the core to be removed easily from the core box by avoiding undercuts.

Moreover, the above-described arrangement is particularly advantageous, for example, for disks in which the bell and the band define a single element. In this case, owing to the shape which the disk will have to adopt, the passageway for the core sand through the cavity may in fact be particularly tortuous because of the presence of a continuous wall between the bell and the braking band. The above-described arrangement may also be advantageous for disks in which the braking band is connected to the bell by means of connecting elements having a first end fixed to the braking band and a second end associated slidably with the bell. In this case, in fact, the flow of sand along the core box may also be tortuous and subject to turbulence which would limit the compactness of the core, particularly in the regions which face the outer side of the band in the region of the outer row of projecting elements 56 corresponding to the pillar-like elements 28.

Naturally variants and/or additions may be provided for the embodiments described and illustrated above. The arrangement of the pillar-like elements and of the corresponding projecting elements may vary. In this case, the advantageous configuration of the pillar-like elements of the inner row, as described above, applies to any of the pillar-like elements which are disposed in the vicinity of the edge of the braking band facing the axis Z-Z. These pillar-like elements correspond to the projecting elements which are reached first by the flow of core sand during the formation of the core 44.

Naturally, the number of pillar-like elements and the shape of the cross-sections of the elements of the outer row and of the intermediate row or, in any case, of the pillar-like elements which are not disposed in the vicinity of the edge of the braking band facing the axis Z-Z, may vary.

In order to satisfy contingent and specific requirements, a person skilled in the art may apply to the above-described preferred embodiment of the braking band, of the disk, and of the core box many modifications, adaptations and replacements of elements with other functionally equivalent elements without, however, departing from the scope of the appended claims.

The invention claimed is:

1. A disk-brake disk comprising: two plates coaxial with a central axis orthogonal to the plates; said plates each having a braking band with an inner and outer edge, said braking band having pillar elements distributed along the band in at least three concentric rings, an innermost ring, intermediate ring, and outermost ring, and are connected to the plates with link radii in a range from about 3 mm to 4 mm;

said plates facing one another and spaced apart to form a space for an air-flow from the axis towards the outer edge of the band, the plates having facing surfaces from which the pillar elements extend transversely to connect the plates;

said pillar elements disposed in the innermost ring having a cross-section with an area, a width, and a length, wherein the length is substantially longer than the width; said cross-section is tapered towards the central axis and towards the outer edge of the braking band, thereby forming a substantially rhombic cross-section;

said pillar elements disposed in the intermediate ring having a cross-section with an area, a width, and a length, wherein the length is substantially longer than the width; said cross-section is tapered towards the central axis and towards the outer edge of the braking band, thereby forming a substantially rhombic cross-section; and the area of the cross-section of the pillar elements of the intermediate ring is approximately equal to the area of the cross-section of the innermost ring;

said pillar elements disposed in the outermost ring having a cross-section tapered towards the central axis, wherein the pillar elements of the outermost ring have a first end having a width and a second end having a width wherein the first end is closer to the central axis.

2. The braking band according to claim 1 in which the pillar elements interconnect the plates over an area no greater than about 15%-25% of the total facing surface area of each plate.

3. The braking band according to claim 2 in which the pillar elements interconnect the plates over an area no greater than 20% of the total facing surface area of each plate.

4. The braking band according to claim 1 in which the pillar elements have linked flat surfaces delimiting the rhombic cross-sections.

5. The braking band according to claim 1 in which the pillar elements of the innermost row have, in an area substantially parallel to the direction of the air-flow through the space, a diagonal of the rhombic cross-section transverse to the direction of flow having dimensions of between about 6 mm and 7 mm.

6. The braking band according to claim 1 in which the pillar elements of the intermediate rows have, in an area substantially parallel to the direction of the air-flow through the space, a diagonal of the rhombic cross-section transverse to the direction of flow having dimensions in a range of between about 7 mm and 8 mm.

7. The braking band according to claim 1 in which the pillar elements of the intermediate rows are offset relative to said pillar elements of the innermost row and pillar elements of the outermost row.

8. The braking band according to claim 1 in which the pillar elements are distributed in a quincuncial arrangement between the two plates.

9. The braking band according to claim 1 in which the pillar elements of innermost and intermediate rows have, in a radial direction, ends with link radii in a range from about 1.5 mm to 2.5 mm.

10. The braking band according to claim 9 in which the pillar elements of the innermost and the intermediate rows have, in a radial direction, ends with link radii of about 2 mm.

11. The braking band according to claim 1 in which the pillar elements of the outermost row have, in a radial direction, a first end with a link radius in a range from about 1.5 to 2.5 mm, and a second end with a link radius in a range from about 4 mm to 5 mm.

12. The braking band according to claim 11 in which the pillar elements of the outermost row have, in a radial direction, the first end with a link radius of about 2 mm.

13. The braking band according to claim 11 in which said second end link radius of the pillar elements of the outermost row is about 4.5 mm.

14. The braking band according to claim 1 in which the pillar elements of the innermost row have, in a direction transverse to the direction of flow, link radii in a range from about 3 mm to 3.5 mm between the flat surfaces.

15. The braking band according to claim 1 in which the pillar elements of the intermediate rows have, in a direction transverse to the direction of flow, link radii in a range from about 3.5 mm to 4 mm between the flat surfaces.

16. The braking band according to claim 1 in which the pillar elements are connected to the plates with link radii of about 3.5 mm.

17. The disk band of claim 1, wherein the braking band contains only three rows of pillar elements distributed along the band in at least three concentric rings, an innermost ring, intermediate ring, and outermost ring.

18. The disk brake disk of claim 1 wherein the cross-section of the innermost and intermediate pillar elements are symmetrical with respect to an axis transverse the direction of air-flow.

19. The disk brake disk of claim 1 wherein the cross-section of the outermost pillar elements have a drop-shaped cross-section tapered towards the central axis.

20. The disk brake disk of claim 1 wherein the width of the second end of the outermost pillar elements is wider than the width of the first end of the outermost pillar elements.

21. The disk brake disk of claim 20 wherein the width of the second end of the outermost pillar elements is approximately twice the width of the first end of the outermost pillar elements.

22. The disk brake disk of claim 1 wherein the cross-section of the innermost and intermediate pillar elements have the same shape.

23. A disk-brake disk comprising: two plates coaxial with a central axis orthogonal to the plates; said plates each having a braking band with an inner and outer edge, said braking band having pillar elements distributed along the band in at least three concentric rings, an innermost ring, intermediate ring, and outermost ring, and are connected to the plates with link radii in a range from about 3 mm to 4 mm;

said plates facing one another and spaced apart to form a space for an air-flow from the axis towards the outer edge of the band, the plates having facing surfaces from which the pillar elements extend transversely to connect the plates;

said pillar elements disposed in the innermost ring having a cross-section with an area, a width, and a length, wherein the length is substantially longer than the width, and starting from a central portion of a maximum tangential extent or largest dimension, the pillar elements are tapered towards the inner edge of the band and towards the outer edge of the band with portions of equal extent and together forming pairs of substantially parallel faces arranged for directing air through the space between the plates;

said pillar elements disposed in the intermediate ring having a cross-section with an area, a width, and a length, wherein the length is substantially longer than the width, and wherein starting from a central portion of a maximum tangential extent or largest dimension, the pillar elements are tapered towards the inner edge of the band and towards the outer edge with portions of equal extent and together forming pairs of substantially parallel faces arranged for directing air through the space between the plates; and the area of the cross-section of the pillar elements of the intermediate ring is approximately equal to the area of the cross section of the innermost ring;

said pillar elements disposed in the outermost ring having a drop-shaped cross-section tapered towards the central axis, wherein the pillar elements of the outermost ring have a first end having a width and a second end having a width wherein the first end is closer to the central axis, and wherein the width of the second end is approximately twice the width of the first end.

24. The disk-brake disk according to claim 23 in which the braking band does not have elements for connection to a bell which have a first end fixed to the braking band and a second end associated slidably with the bell.

25. The disk-brake disk according to claim 23 in which a plate of the braking band is connected to a bell.

26. The disk-brake disk according to claim 23 in which radial ends of the cross-sections of adjacent rows, considered in an area substantially parallel to the direction of the air-flow through the space, are substantially aligned on a common circle.

27. The disk-brake disk according to claim 23 or claim 26 in which each of the pillar elements of each row has substantially the same radial extent in the said cross- section.

28. The disk-brake disk according to claim 23 in which the pillar elements interconnect the plates over an area no greater than about 15%-25% of a total facing surface area of each plate.

29. The braking band according to claim 28 in which the pillar elements interconnect the plates over an area no greater than 20% of the total facing surface area of each plate.

30. The disk-brake disk according to claim 23 in which the pillar elements have linked flat surfaces delimiting the rhombic cross-sections.

31. The disk-brake disk according to claim 23 in which the pillar elements of the outermost row have a substantially drop-shaped cross-section in an area substantially parallel to the direction of the air-flow through the space.

32. The disk-brake disk according to claim 23 in which one or two further intermediate rows of pillar elements are provided.

33. The disk-brake disk according to claim 32, wherein the pillar elements of the intermediate rows are offset relative to said pillar elements of the innermost row and pillar elements of an outer row.

34. The disk-brake disk according to claim 32, wherein the pillar elements of the innermost and intermediate rows have, in a radial direction, ends with link radii in a range from about 1.5 mm to 2.5 mm.

35. The braking band according to claim 34 in which the pillar elements of the innermost and the intermediate rows have, in a radial direction, ends with link radii of about 2 mm.

36. The disk-brake disk according to claim 23 in which the pillar elements of the innermost row have, in an area substantially parallel to the direction of the air-flow through the space, a diagonal of the rhombic cross-section transverse to the direction of flow having dimensions in a range of between about 6 mm and 7 mm.

37. The disk-brake disk according to claim 23 in which the pillar elements of the intermediate rows have, in an area substantially parallel to the direction of the air-flow through the space, a diagonal of the rhombic cross-section transverse to the direction of flow having dimensions in a range of between about 7 mm and 8 mm.

38. The disk-brake disk according to claim 23 in which the pillar elements are distributed in a quincuncial arrangement between the two plates.

39. The disk-brake disk according to claim 23 in which the pillar elements of the outermost row have, in a radial direction, a first end with a link radius in a range from about 1.5 to 2.5 mm, and a second end with a link radius in a range from about 4 mm to 5 mm.

40. The braking band according to claim 39 in which the pillar elements of the outermost row have, in a radial direction, the first end with a link radius of about 2 mm.

41. The braking band according to claim 39 in which said second end link radius of the pillar elements of the outermost row is about 4.5 mm.

42. The disk-brake disk according to claim 23 in which the pillar elements of the innermost row have, in a direction transverse to the direction of flow, link radii in a range from about 3 mm to 3.5 mm between the flat surfaces.

43. The disk-brake disk according to claim 23 in which the pillar elements are connected to the plates with link radii in a range from about 3 mm to 4 mm.

44. The braking band according to claim 43 in which the pillar elements are connected to the plates with link radii of about 3.5 mm.

45. The disk band of claim 23, wherein the braking band contains only three rows of pillar elements distributed along the band in at least three concentric rings, an innermost ring, intermediate ring, and outermost ring.

46. The disk brake disk of claim 23 wherein the cross-section of the innermost and intermediate pillar elements are symmetrical with respect to an axis transverse the direction of air-flow.

47. The disk brake disk of claim 23 wherein the cross-section of the outermost pillar elements have a drop-shaped cross-section tapered towards the central axis.

48. The disk brake disk of claim 23 wherein the width of the second end of the outermost pillar elements is wider than the width of the first end of the outermost pillar elements.

49. The disk brake disk of claim 48 wherein the width of the second end of the outermost pillar elements is approximately twice the width of the first end of the outermost pillar elements.

50. The disk brake disk of claim 23 wherein the cross-section of the innermost and intermediate pillar elements have the same shape.

\* \* \* \* \*